(12) United States Patent
Watanabe

(10) Patent No.: US 8,471,934 B2
(45) Date of Patent: Jun. 25, 2013

(54) COMPUTER READABLE STORAGE MEDIUM, IMAGE CORRECTION APPARATUS, AND IMAGE CORRECTION METHOD

(75) Inventor: Masahiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 38 days.

(21) Appl. No.: 12/923,345

(22) Filed: Sep. 15, 2010

(65) Prior Publication Data
US 2011/0007192 A1 Jan. 13, 2011

Related U.S. Application Data

(63) Continuation of application No. PCT/JP2008/072044, filed on Dec. 4, 2008.

(30) Foreign Application Priority Data

Mar. 18, 2008 (JP) .................................. 2008-070176

(51) Int. Cl.
*H04N 5/202* (2006.01)
*H04N 5/225* (2006.01)
*G06K 9/40* (2006.01)

(52) U.S. Cl.
USPC .................. 348/254; 348/216.1; 382/274

(58) Field of Classification Search
USPC .......... 348/207.1, 216.1, 222.1, 234, 254–256; 382/274
See application file for complete search history.

(56) References Cited

U.S. PATENT DOCUMENTS

| 5,668,890 | A | 9/1997 | Winkelman |
| 7,010,160 | B1 * | 3/2006 | Yoshida ........................ 382/162 |
| 8,031,935 | B2 * | 10/2011 | Shiraishi ...................... 382/163 |
| 2003/0152283 | A1 | 8/2003 | Moriwaki |

FOREIGN PATENT DOCUMENTS

| JP | 6-141183 | 5/1994 |
| JP | 7-311833 | 11/1995 |
| JP | 2000-59629 | 2/2000 |
| WO | 2007/072548 A1 | 6/2007 |

OTHER PUBLICATIONS

International Search Report for PCT/JP2008/072044, mailed Mar. 3, 2009.

* cited by examiner

*Primary Examiner* — Daniel M Pasiewicz
(74) *Attorney, Agent, or Firm* — Staas & Halsey LLP

(57) ABSTRACT

An image correction apparatus includes a dark-pixel-region extracting unit that extracts a dark pixel region of image data photographed by a photographing unit, a dark-pixel-area calculating unit that calculates an area of the dark pixel region extracted by the dark-pixel-region extracting unit, a luminance-value-variance calculating unit that calculates variance of luminance values of pixels in the dark pixel region extracted by the dark-pixel-region extracting unit, and an image correction unit that corrects brightness of the image data in accordance with the area calculated by the dark-pixel-area calculating unit and in accordance with the variance of the luminance values calculated by the luminance-value-variance calculating unit.

12 Claims, 6 Drawing Sheets

EXAMPLE IMAGE OF BACKLIGHT
(IMAGE TAKEN THROUGH WINDOW FROM DARK ROOM)

EXAMPLE IMAGE THAT IS NOT UNDEREXPOSED
DESPITE WIDE GRADATION RANGE
(FLASH PHOTOGRAPHY OF FIGURE TAKEN IN FRONT OF
DARK COLORED PLANTS)

COMPUTER READABLE STORAGE MEDIUM, IMAGE CORRECTION APPARATUS, AND IMAGE CORRECTION METHOD

CROSS-REFERENCE TO RELATED APPLICATION(S)

This application is a continuation of International Application No. PCT/JP2008/072044, filed on Dec. 4, 2008 which claims the benefit of priority from Japanese Patent Application No. 2008-070176, filed on Mar. 18, 2008, the entire contents of which are incorporated herein by reference.

FIELD

The embodiments discussed herein are directed to a computer readable storage medium, an image correction apparatus, and an image correction method that are used to perform a correction process on acquired image data.

BACKGROUND

In conventional technology for correcting image data, when a significant difference between brightness and darkness is detected in a histogram of the image data, or, when many dark pixels are present in the image data, such image data is determined to be underexposed or backlighted, and brightness conversion is performed on the image data to correct it.

Even when many dark pixels are present in the image, if the image is taken of a night scene, the image is not underexposed or backlighted. Accordingly, there is a known technology for determining, in accordance with the number of dark pixels which is in contact with an image rectangular (a contour of a region in which an image is displayed), whether an image is underexposed (an image that needs to be subjected to brightness-conversion correction) or is low key (an image that does not need to be subjected to brightness-conversion) (see International Publication Pamphlet No. WO 2007-072548).

However, the technology for determining whether an image is underexposed or low key, in accordance with the number of dark pixels which is in contact with the image rectangular, may erroneously determine an image to be low key, even when many dark pixels are present in the image rectangular; for example, when the image is obtained by photographing an entire room including a window through which a bright outside scene may be seen from the dark room. As a result, in some cases, image data is not appropriately corrected due to erroneous determination, which is a problem.

SUMMARY

According to an aspect of an embodiment of the invention, a computer readable storage medium having stored therein an image correction program, the image correction program causing a computer to execute a process. The process includes: extracting a dark pixel region of image data photographed by a photographing unit; firstly calculating an area of the dark pixel region extracted in the extracting; secondly calculating variance of luminance values of pixels in the dark pixel region extracted in the extracting; and correcting brightness of the image data in accordance with the area calculated in the firstly calculating and in accordance with the variance of the luminance values calculated in the secondly calculating.

According to another aspect of an embodiment of the invention, an image correction apparatus includes: a dark-pixel-region extracting unit that extracts a dark pixel region of image data photographed by a photographing unit; a dark-pixel-area calculating unit that calculates an area of the dark pixel region extracted by the dark-pixel-region extracting unit; a luminance-value-variance calculating unit that calculates variance of luminance values of pixels in the dark pixel region extracted by the dark-pixel-region extracting unit; and an image correction unit that corrects brightness of the image data in accordance with the area calculated by the dark-pixel-area calculating unit and in accordance with the variance of the luminance values calculated by the luminance-value-variance calculating unit.

According to still another aspect of an embodiment of the invention, an image correction method includes: extracting a dark pixel region of image data photographed by a photographing unit; firstly calculating an area of the dark pixel region extracted in the extracting; secondly calculating variance of luminance values of pixels in the dark pixel region extracted in the extracting; and correcting brightness of the image data in accordance with the area calculated in the firstly calculating and in accordance with the variance of the luminance values calculated in the secondly calculating.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings.

[a] First Embodiment

In the following embodiment, the configuration of an image correction apparatus according to a first embodiment and the flow of processing thereof are described in this order. Finally, advantages of the first embodiment will be described. In the following, a case in which image data captured with a digital camera is corrected by the image correction apparatus and the corrected data is output to a printer connected thereto will be described.

Configuration of the Image Correction Apparatus

Figure 1:
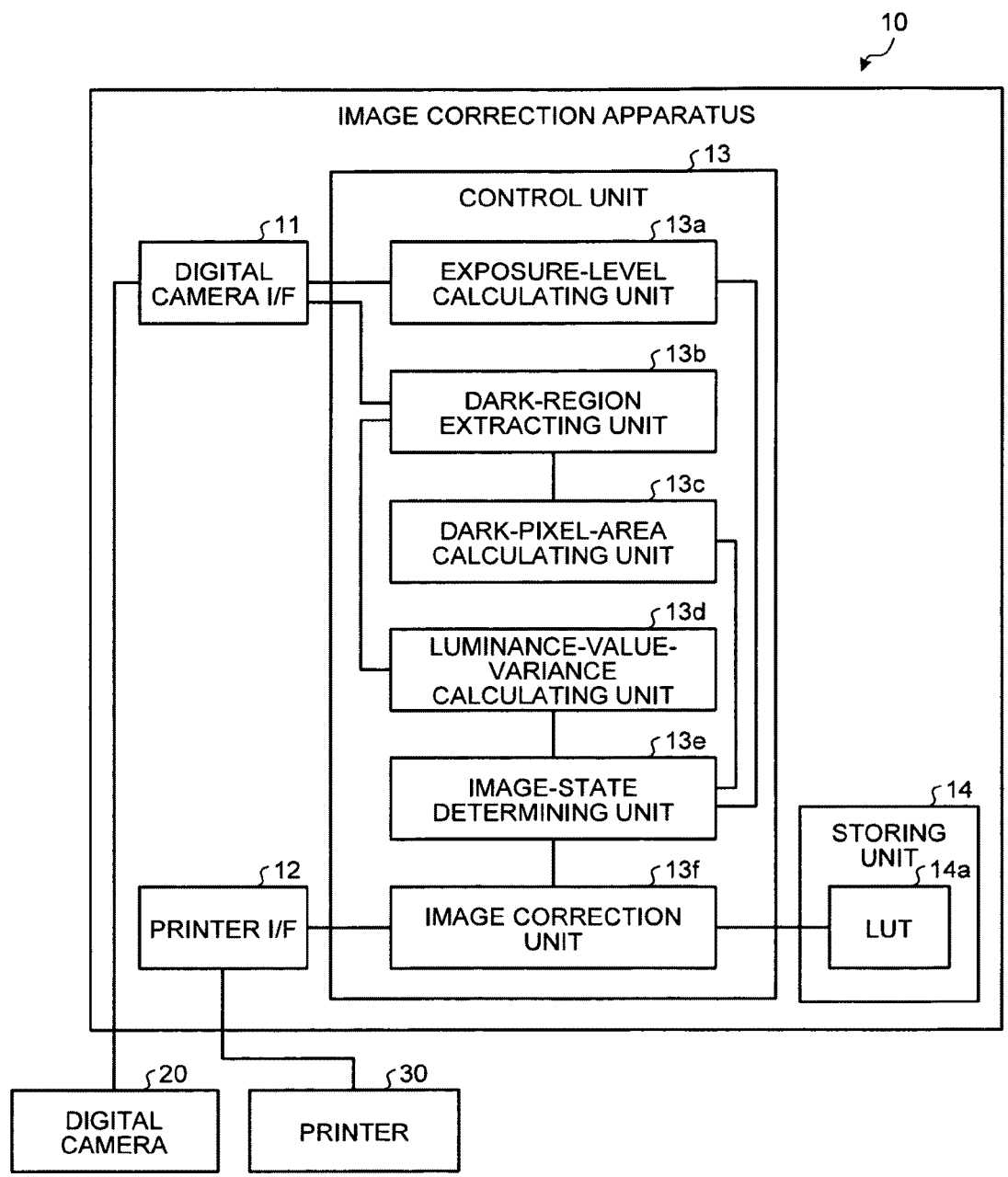
FIG. 1 is a block diagram illustrating the configuration of an image correction apparatus according to a first embodiment.

In the following, the configuration of an image correction apparatus 10 according to the first embodiment will be described with reference to FIG. 1. FIG. .1 is a block diagram illustrating the configuration of the image correction apparatus 10 according to the first embodiment. As illustrated in FIG. 1, the image correction apparatus 10 includes a digital camera I/F 11, a printer I/F 12, a control unit 13, and a storing unit 14. The image correction apparatus is connected to a digital camera 20 and a printer 30 via a cable or a network. Processes performed by these units will be described below.

The digital camera I/F 11 controls communication of various kinds of information exchanged with the digital camera 20 connected thereto. Specifically, the digital camera I/F 11 receives photographed image data from the digital camera 20.

The printer I/F 12 controls communication of various kinds of information exchanged with the printer 30 connected thereto. Specifically, the printer I/F 12 sends, to the printer 30, image data subjected to a correction process.

Figure 2:
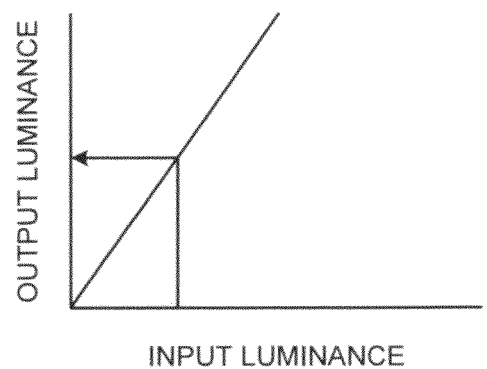
FIG. 2 is a schematic diagram explaining a look up table.

The storing unit 14 stores therein data and programs for various kinds of processes performed by the control unit 13. The storing unit 14 includes a look up table (hereinafter, referred to as an LUT) 14a, which is particularly and closely related to the present invention. As illustrated in FIG. 2, the LUT 14a is a conversion table representing the correlation between luminance values of an input image and luminance values of an output image. As in the example illustrated in FIG. 2, the LUT 14a contains an LUT for brightness conversion in order to make the luminance value of output luminance greater than that of input luminance.

The control unit 13 has an internal memory for storing data and programs prescribing various kinds of procedures, whereby various kinds of processes are executed. The control unit 13 includes an exposure-level calculating unit 13a, a dark-region extracting unit 13b, a dark-pixel-area calculating unit 13c, a luminance-value-variance calculating unit 13d, an image-state determining unit 13e, and an image correction unit 13f, which are particularly and closely related to the present invention.

The exposure-level calculating unit 13a calculates, using information that is related to the digital camera 20 and that is obtained when an image is photographed, an exposure level (exposure value (EV)). Specifically, the exposure-level calculating unit 13a receives, from the digital camera 20, image acquisition data; calculates, from Exif information in the image acquisition data, an exposure level (EV); and notifies it to the image-state determining unit 13e, which will be described later.

The dark-region extracting unit 13b extracts a dark pixel region of image data. For example, as a method of extracting a dark pixel region, the dark-region extracting unit 13b may extract pixels ranking in the top 10% of dark luminance in the image and then extract a region in which the extracted pixels are massed (neighboring) as a dark pixel region.

Furthermore, as a method of extracting a dark pixel region, the dark-region extracting unit 13b may extract a pixel having the darkest luminance, and determine whether luminance of a pixel neighboring the darkest pixel is lower than a certain threshold. If the luminance of the pixel is lower than the threshold, the dark-region extracting unit 13b further determines whether luminance of a pixel neighboring that pixel neighboring the darkest pixel is lower than the certain threshold. By repeating this process to search for dark pixels, the dark-region extracting unit 13b may extract an assembly of searched dark pixels as a dark pixel region. Then, the dark-region extracting unit 13b notifies the dark-pixel-area calculating unit 13c and the luminance-value-variance calculating unit 13d, which will be described later, of the extracted dark pixel region.

The dark-pixel-area calculating unit 13c calculates an area of the extracted dark pixel region. Specifically, the dark-pixel-area calculating unit 13c receives the dark pixel region notified from the dark-region extracting unit 13b; calculates an area of the dark pixel region; and notifies it to the image-state determining unit 13e, which will be described later.

The luminance-value-variance calculating unit 13d calculates variance of luminance values of pixels in the extracted dark pixel region. Specifically, the luminance-value-variance calculating unit 13d receives the dark pixel region notified from the dark-region extracting unit 13b and determines whether there is any gradation in the dark pixel region.

Then, if there is gradation, the luminance-value-variance calculating unit 13d calculates the difference value between the luminance value of the brightest pixel and the luminance value of the darkest pixel in the dark pixel region, as a method of calculating the variance of luminance values of pixels based on the gradation. Thereafter, the luminance-value-variance calculating unit 13d notifies the image-state determining unit 13e, which will be described later, of the calculated variance of the luminance values.

The image-state determining unit 13e determines whether the area of the dark pixel region is greater than a certain threshold and whether the variance of the luminance values of the pixels is greater than a certain threshold. Specifically, if the image-state determining unit 13e receives the exposure level (EV), the area of the dark pixel region, and the variance of the luminance values, the image-state determining unit 13e determines whether the area of the dark pixel region is greater than a certain threshold and the variance of the luminance values of the pixels is greater than a certain threshold.

As a result of the determination, if the image-state determining unit 13e determines that the area of the dark pixel region is smaller than the certain threshold or determines that the variance of the luminance values of the pixels is lower than the certain threshold, the image-state determining unit 13e notifies the image correction unit 13f of a request for outputting, to the printer 30, an original image without performing a correction process. Furthermore, if the image-state determining unit 13e determines that the area of the dark pixel region is greater than the certain threshold and determines that the variance of the luminance values of the pixels is greater than the certain threshold, the image-state determining unit 13e determines whether the exposure level (EV) is lower than a first certain threshold.

Figure 3:
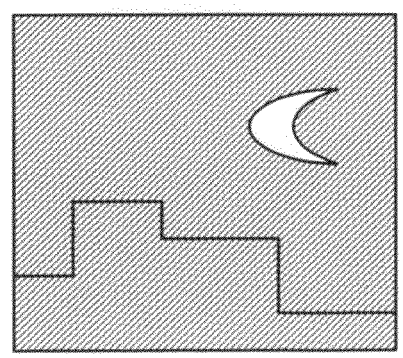
FIG. 3 is a schematic diagram explaining a correction process of an image.

As a result of the determination, if the exposure level is lower than the first certain threshold, the image-state determining unit 13e notifies the image correction unit 13f of the request for outputting, to the printer 30, the original image without performing the correction process. An image data obtained in such a case is expected to be a night scene image in which light intensity is originally low, like that illustrated in FIG. 3 as an example. Accordingly, the image-state determining unit 13e determines not to perform correction processing (brightness conversion) (i.e., determines that the image is low key).

Figure 4:
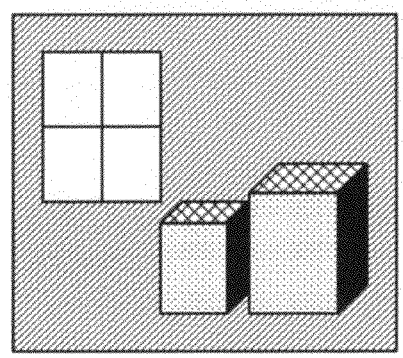
FIG. 4 is a schematic diagram explaining a correction process of an image.
Figure 5:
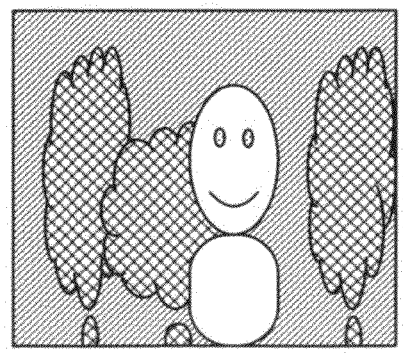
FIG. 5 is a schematic diagram explaining a correction process of an image.

Furthermore, on determining that the exposure level is greater than the first certain threshold, the image-state determining unit 13e proceeds to determine whether the exposure level is lower than a second certain threshold that is greater than the first threshold (i.e., determines whether the exposure level is an intermediate level). As a result of the determination, when the image-state determining unit 13e determines that the exposure level is lower than the second certain threshold (i.e., determines that the exposure level is an intermediate level), the image-state determining unit 13e notifies the image correction unit 13f of a request for performing, using the LUT 14a, brightness conversion as image correction. In other words, because image data obtained in such a case may be expected to be an image taken against the light like that illustrated in FIG. 4 as an example (a picture taken through a window from a dark room), the image-state determining unit 13e determines to perform correction processing (brightness conversion).

On determining that the exposure level is greater than the second certain threshold, the image-state determining unit 13e notifies the image correction unit 13f of a request for outputting, to the printer 30, the original image without performing the correction processing. Because image data obtained in such a case may be expected to be an image that is not taken against the light and whose light level is sufficient even though it has a wide gradation range (e.g., a flash photography image of a figure taken in front of dark colored plants), the image-state determining unit 13e determines not to perform the correction processing (brightness conversion).

The image correction unit 13f corrects brightness of image data in accordance with the calculated area and the calculated variance of luminance values. Specifically, if the image correction unit 13f receives, from the image-state determining unit 13e, a request for performing brightness conversion using the LUT 14a, the image correction unit 13f performs the brightness conversion using the LUT 14a and then outputs the image data to the printer 30. Furthermore, if the image correction unit 13f receives, from the image-state determining unit 13e, a request for outputting the original image to the printer 30, the image correction unit 13f outputs the original image to the printer 30.

Process Performed by the Image Correction Apparatus

Figure 6:
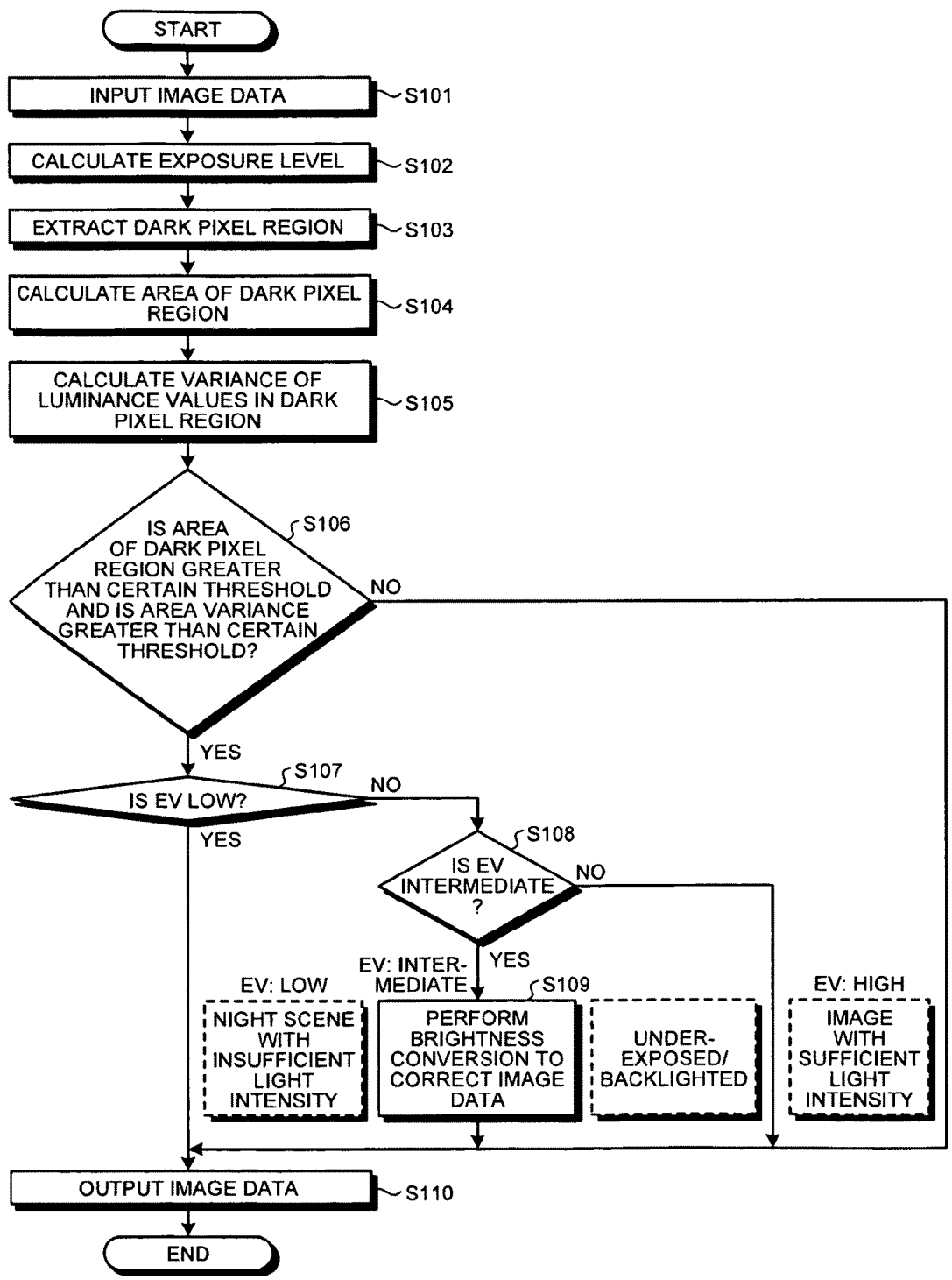
FIG. 6 is a flowchart illustrating the flow of a process procedure performed by the image correction apparatus according to the first embodiment.

In the following, a process performed by the image correction apparatus 10 according to the first embodiment will be described with reference to FIG. 6. FIG. 6 is a flowchart illustrating the flow of a process performed by the image correction apparatus according to the first embodiment. As illustrated in FIG. 6, the image correction apparatus 10 receives, from the digital camera 20, image data (S101) and calculates, from Exif information, an exposure level (EV) (S102).

Then, the image correction apparatus 10 extracts a dark pixel region of the image data (S103) and calculates the area of the dark pixel region (S104). Subsequently, the image correction apparatus 10 calculates, based on the gradation in the extracted dark pixel region, the variance of the luminance values of the pixels (S105).

Then, the image correction apparatus 10 determines whether the area of the dark pixel region is greater than a certain threshold and whether the variance of the luminance values of the pixels is greater than a certain threshold (S106). If, as a result of the determination, the image correction apparatus 10 determines that the area of the dark pixel region is smaller than the certain threshold or determines that the variance of the luminance values of the pixels is lower than the certain threshold (No at S106), the image correction apparatus 10 outputs the original image to the printer 30 without performing a correction process (S110).

If the image correction apparatus 10 determines that the area of the dark pixel region is greater than the certain threshold and determines that the variance of the luminance values of the pixels is greater than the certain threshold (Yes at S106), the image correction apparatus 10 then determines whether the exposure level (EV) is lower than the first certain threshold (S107). If, as a result of the determination, the image correction apparatus 10 determines that the exposure level is lower than the first certain threshold (Yes at S107), the image correction apparatus 10 outputs the original image to the printer 30 without performing the correction process (S110).

If the image correction apparatus 10 determines that the exposure level is greater than the first certain threshold (No at S107), the image correction apparatus 10 determines whether the exposure level is lower than the second certain threshold that is greater than the first threshold (i.e., determines whether the exposure level is an intermediate level) (S108).

If, as a result of the determination, the image correction apparatus 10 determines that the exposure level is lower than the second certain threshold (i.e., determines that the exposure level is an intermediate level) (Yes at S108), the image correction apparatus 10 performs brightness conversion, using the LUT 14a, as image correction (S109) and outputs the corrected image to the printer 30 (S110). If the image correction apparatus 10 determines that the exposure level is greater than the second certain threshold (No S108), the image correction apparatus 10 outputs the original image to the printer 30 without performing the correction process (S110).

Advantage of the First Embodiment

As described above, the image correction apparatus 10 extracts a dark pixel region of image data; calculates an area of the extracted dark pixel region; calculates variance of the luminance values of the pixels in the extracted dark pixel region; and corrects the brightness of the image data in accordance with the calculated area and calculated variance of the luminance values. Accordingly, it is possible to accurately determine whether an image is backlighted by detecting the area of a dark pixel region and fluctuation in brightness/darkness. As a result, it is possible to appropriately correct the image data by preventing erroneous determination.

Furthermore, according to the first embodiment, the image correction apparatus 10 determines whether the calculated area of the dark pixel region is greater than the certain threshold and whether the calculated variance of the luminance values of the pixels is greater than the certain threshold. If the image correction apparatus 10 determines that the area of the dark pixel region is greater than the certain threshold and determines that the variance of the luminance values of the pixels is greater than the certain threshold, the image correction apparatus 10 corrects the brightness of the image data. Accordingly, the image correction apparatus 10 does not erroneously determine that a backlighted image, such as a picture taken from a dark room toward a bright window, is low key. Furthermore, even when an image has a wide gradation range in a dark region, the image correction apparatus 10 does not erroneously determine that the image is underexposed or backlighted by recognizing, from an EV, that the image has been taken under an optimum photographic condition. As a result, it is possible to appropriately correct the image data by preventing erroneous determination.

Furthermore, according to the first embodiment, by using information on the digital camera 20 obtained when the image is photographed, the image correction apparatus 10 calculates an exposure level and corrects the brightness of the image data in accordance with the calculated area of the dark pixel region, the calculated variance of the luminance values, and the calculated exposure level. Accordingly, it is possible to determine whether the image is backlighted by recognizing photographic conditions from the exposure level. As a result, image data may be suitably corrected by preventing erroneous determination.

Furthermore, according to the first embodiment, the image correction apparatus 10 determines whether the calculated exposure level is greater than the first certain threshold. If the image correction apparatus 10 determines that the exposure level is greater than the first certain threshold, the image correction apparatus 10 determines whether the exposure level is greater than the second certain threshold that is greater than the first threshold. If the image correction apparatus 10 determines that the exposure level is lower than the second certain threshold, the image correction apparatus 10 corrects the brightness of the image data. Accordingly, by recognizing that an intermediate exposure level produces good photographic conditions, the image correction apparatus 10 does not erroneously determine that the image is underexposed or backlighted. As a result, image data may be appropriately corrected by preventing erroneous determination.

[b] Second Embodiment

The embodiment of the present invention has been described; however, the present invention is not limited to the embodiment described above and may be implemented with various kinds of embodiments other than the embodiment described above. Therefore, another embodiment included in the present invention will be described below as a second embodiment.

[b-1] Image Correction

In the first embodiment, a case is described in which the image correction is performed only when the exposure level is an intermediate level; however, the present invention is not limited thereto. For example, the brightness of the image data may be corrected by making the degree of correction greater as the exposure level gets closer to an intermediate level.

Figure 7:
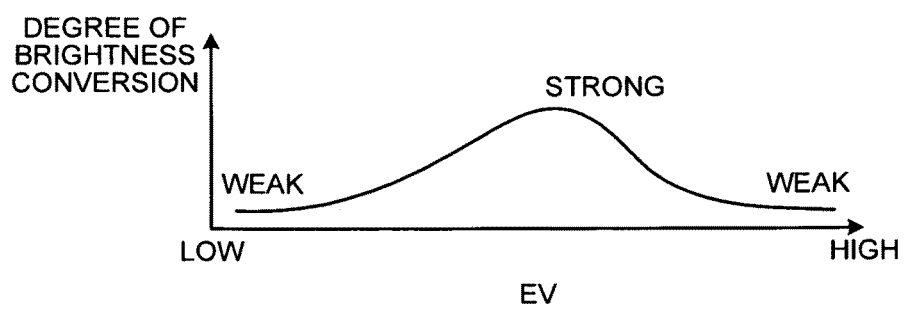
FIG. 7 is a schematic diagram explaining a correction process of an image performed, in accordance with an exposure value, by an image correction apparatus according to a second embodiment.

Specifically, as illustrated in FIG. 7, an image correction apparatus according to the second embodiment performs brightness conversion by making the degree of correction greater as the exposure level gets closer to the intermediate level between the minimum exposure level and the maximum exposure level and, by making the degree of correction lower as the exposure level moves away from the intermediate level.

[b-2] Digital Camera

In the first embodiment described above, a case in which the digital camera sends image data to an external image correction apparatus and the image correction apparatus corrects the image data is described; however, the present invention is not limited thereto. For example, the image correction apparatus may be applied to the digital camera, and a correction process may be performed on image data that is acquired by the digital camera itself.

[b-3] System Configuration, etc.

The components of each device illustrated in the drawings are only for conceptually illustrating the functions thereof and are not necessarily physically configured as illustrated in the drawings. In other words, the specific shape of a separate or integrated device is not limited to the drawings; however, all or part of the device may be configured by functionally or physically separating or integrating any of the units depending on various loads or use conditions. For example, the image-state determining unit 13e may be integrated with the image correction unit 13f. Furthermore, all or a part of the processing functions performed by each unit may be implemented by a CPU and programs analyzed and executed by the CPU or may be implemented as hardware by wired logic.

Furthermore, of the processes described in the embodiments, the whole or a part of the processes that are mentioned as being automatically performed may be manually performed or the whole or a part of the processes that are mentioned as being manually performed may be automatically performed using known methods. Furthermore, process procedures, the control procedures, the specific names, and the information containing various kinds of data or parameters indicated in the above specification and drawings may be arbitrarily changed unless otherwise noted. For example, the certain threshold that is used to determine the above-described image state may be arbitrarily changed.

[b-4] Programs

Figure 8:
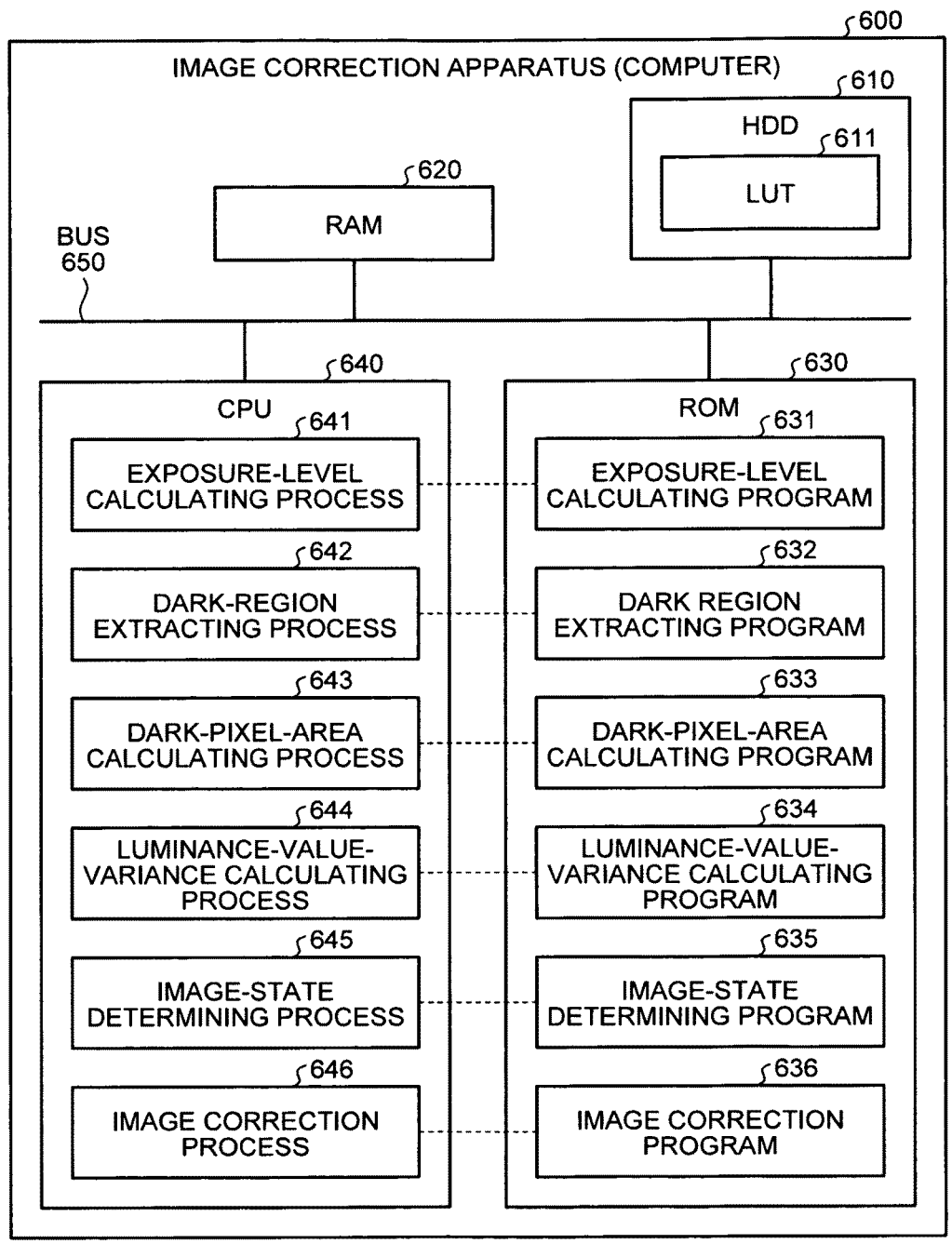
FIG. 8 is a block diagram illustrating a computer that executes an image correction program.

Various kinds of processes described in the above embodiment may be implemented by programs prepared in advance and executed by a computer. Accordingly, in the following, a computer that executes programs having the same function as those described in the embodiment described above will be described as an example with reference to FIG. 8. FIG. 8 is a block diagram illustrating a computer that executes an image correction program.

As illustrated in FIG. 8, a computer 600 serving as the image correction apparatus includes an HDD 610, a RAM 620, a ROM 630 and a CPU 640, which are connected via a bus 650.

The ROM 630 stores therein, in advance, an image correction program having the same functions as the above-described embodiment. Specifically, the ROM 630 stores therein, as illustrated in FIG. 8, an exposure-level calculating program 631, a dark region extracting program 632, a dark-pixel-area calculating program 633, a luminance-value-variance calculating program 634, an image-state determining program 635, and an image correction program 636. These programs 631 to 636 may appropriately be integrated or separated in the same manner as the components of the image correction apparatus illustrated in FIG. 1.

As illustrated in FIG. 8, because the CPU 640 reads these programs 631 to 636 from the ROM 630 and executes them, these programs 631 to 636 function as an exposure-level calculating process 641, a dark-region extracting process 642, a dark-pixel-area calculating process 643, a luminance-value-variance calculating process 644, an image-state determining process 645, and an image correction process 646, respectively. These processes 641 to 646 correspond to the exposure-level calculating unit 13a, the dark-region extracting unit 13b, the dark-pixel-area calculating unit 13c, the luminance-value-variance calculating unit 13d, the image-state determining unit 13e, and the image correction unit 13f, respectively, illustrated in FIG. 1.

As illustrated in FIG. 8, the HDD 610 includes an LUT 611 that corresponds to the LUT 14a illustrated in FIG. 1. The CPU 640 executes the image correction process using the LUT 611.

According to an aspect of the present invention, an advantage is provided in that image data may be appropriately corrected by preventing erroneous determination.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable storage medium having stored therein an image correction program, the image correction program causing a computer to execute a process comprising:

extracting a dark pixel region of image data photographed by a photographing unit;
firstly calculating an area of the dark pixel region extracted in the extracting;
secondly calculating variance of luminance values of pixels in the dark pixel region extracted in the extracting; and
correcting brightness of the image data in accordance with the area calculated in the firstly calculating and in accordance with the variance of the luminance values calculated in the secondly calculating, and
wherein the correcting includes correcting the brightness of the image data in accordance with the area calculated in the firstly calculating, the variance of the luminance values calculated in the secondly calculating, and an exposure level during photographing the image data.

2. The non-transitory computer readable storage medium according to claim 1,
wherein the correcting includes correcting the brightness of the image data when the area of the dark pixel region calculated in the firstly calculating is greater than an area threshold and the variance of the luminance values of the pixels calculated in the secondly calculating is greater than a variance threshold.

3. The non-transitory computer readable storage medium according to claim 1, wherein
the correcting includes correcting, when the exposure level during photographing the image data is between a first threshold and a second threshold, the brightness of the image data.

4. The non-transitory computer readable storage medium according to claim 1, wherein
the correcting includes correcting the brightness of the image data by making the degree of correction greater as the exposure level during photographing the image data gets closer to an intermediate level between a minimum exposure level and a maximum exposure level.

5. An image correction apparatus comprising:
a dark-pixel-region extracting unit that extracts a dark pixel region of image data photographed by a photographing unit;
a dark-pixel-area calculating unit that calculates an area of the dark pixel region extracted by the dark-pixel-region extracting unit;
a luminance-value-variance calculating unit that calculates variance of luminance values of pixels in the dark pixel region extracted by the dark-pixel-region extracting unit; and
an image correction unit that corrects brightness of the image data in accordance with the area calculated by the dark-pixel-area calculating unit and in accordance with the variance of the luminance values calculated by the luminance-value-variance calculating unit, and
wherein the image correction unit corrects the brightness of the image data in accordance with the area calculated by the dark-pixel-area calculating unit, the variance of the luminance values calculated by the luminance-value-variance calculating unit, and an exposure level calculated by the exposure-level calculating unit during photographing the image data.

6. The image correction apparatus according to claim 5, wherein
the image correction unit corrects the brightness of the image data when the area of the dark pixel region calculated by the dark-pixel-area calculating unit is greater than an area threshold and the variance of the luminance values of the pixels calculated by the luminance-value-variance calculating unit is greater than a variance threshold.

7. The image correction apparatus according to claim 5, wherein
the image correction unit corrects, when the exposure level during photographing the image data is between a first threshold and a second threshold, the brightness of the image data.

8. The image correction apparatus according to claim 5, wherein the image correction unit corrects the brightness of the image data by making the degree of correction greater as the exposure level during photographing the image data gets closer to an intermediate level between a minimum exposure level and a maximum exposure level.

9. An image correction method comprising:
extracting a dark pixel region of image data photographed by a photographing unit;
firstly calculating an area of the dark pixel region extracted in the extracting;
secondly calculating variance of luminance values of pixels in the dark pixel region extracted in the extracting; and
correcting brightness of the image data in accordance with the area calculated in the firstly calculating and in accordance with the variance of the luminance values calculated in the secondly calculating, and
wherein the correcting includes correcting the brightness of the image data in accordance with the area calculated in the firstly calculating, the variance of the luminance values calculated in the secondly calculating, and an exposure level during photographing the image data.

10. The image correction method according to claim 9,
wherein the correcting includes correcting the brightness of the image data when the area of the dark pixel region calculated in the firstly calculating is greater than an area threshold and the variance of the luminance values of the pixels calculated in the secondly calculating is greater than a variance threshold.

11. The image correction method according to claim 9, wherein
the correcting includes correcting, when the exposure level during photographing the image data is between a first threshold and a second threshold, the brightness of the image data.

12. The image correction method according to claim 9, wherein
the correcting includes correcting the brightness of the image data by making the degree of correction greater as the exposure level during photographing the image data gets closer to an intermediate level between a minimum exposure level and a maximum exposure level.

* * * * *